United States Patent [19]
Sochacki

[11] Patent Number: 5,889,850
[45] Date of Patent: Mar. 30, 1999

[54] INTERFACE CARD FOR USE IN A TELECOMMUNICATIONS NETWORK

[75] Inventor: John W. Sochacki, West Chicago, Ill.

[73] Assignee: Lucent Technologies Inc., Murray Hill, N.J.

[21] Appl. No.: 720,983

[22] Filed: Oct. 15, 1996

[51] Int. Cl.⁶ .............................. H04M 3/00; H04M 5/00
[52] U.S. Cl. ......................... 379/329; 379/329; 379/330
[58] Field of Search ................................... 379/329, 330, 379/332, 438, 439; 361/754, 798, 796; 439/157, 160, 347, 159, 152, 153

[56] References Cited

U.S. PATENT DOCUMENTS

| | | | |
|---|---|---|---|
| 4,579,408 | 4/1986 | Sasaki | 439/157 |
| 4,602,835 | 7/1986 | Bauer et al. | 439/160 |
| 4,736,409 | 4/1988 | Hasegawa et al. | 379/269 |
| 5,140,501 | 8/1992 | Takahashi et al. | 361/754 |
| 5,192,222 | 3/1993 | Krause et al. | 439/347 |
| 5,480,319 | 1/1996 | Vlakancic | 439/347 |
| 5,583,867 | 12/1996 | Poole | 439/61 |
| 5,692,043 | 11/1997 | Gliga et al. | 379/332 |

*Primary Examiner*—Jack Chiang
*Assistant Examiner*—Benny Q. Tieu
*Attorney, Agent, or Firm*—Dennis J. Williamson; John W. Hayes

[57] ABSTRACT

The interface card consists of a circuit pack containing the line or trunk circuitry and a face plate connected to one side of the circuit pack. A first connector is located on the side of the circuit pack opposite the face plate for connecting the line card to the backplane of the switching system or other network element. A second connector is provided on the face plate for connecting the circuit pack to the cable plug of the cabling. To disconnect the connector, an ejection mechanism is provided on the face plate of the interface card. The ejection mechanism slides relative to the face plate to force camming surfaces into engagement with abutment surfaces on the cable plug thereby forcing the cable plug perpendicularly away from the face plate. Thus the plug is removed without damaging the pin connectors. A locking device can be optionally provided on the ejection mechanism to lock the cable plug into engagement with the pin connector to prevent inadvertent disconnection.

17 Claims, 3 Drawing Sheets

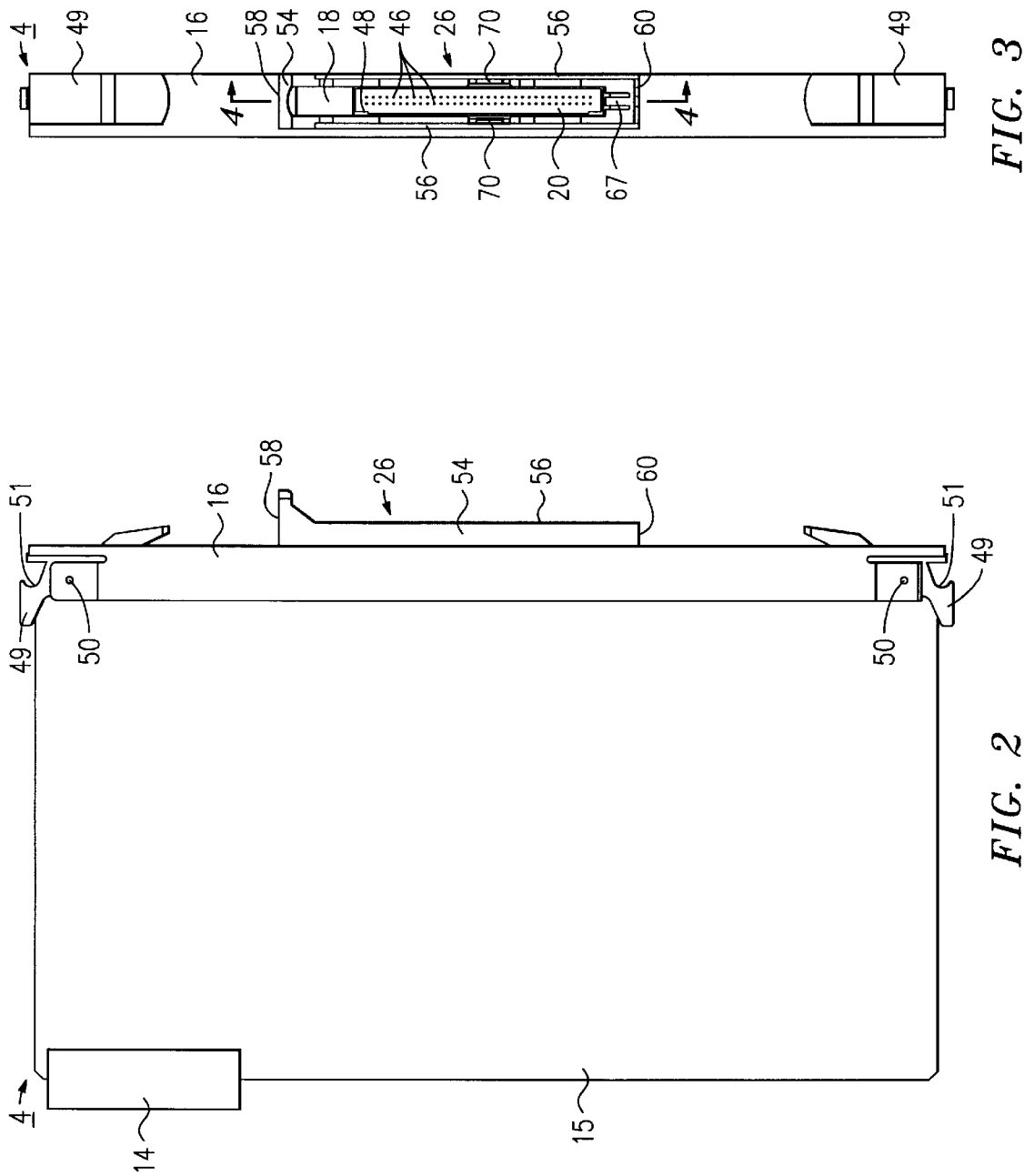

INTERFACE CARD FOR USE IN A TELECOMMUNICATIONS NETWORK

BACKGROUND OF INVENTION

The invention relates, generally, to telecommunications networks and, more particularly, to an improved interface card for use in such networks.

It will be appreciated that a typical telecommunications network consists of a plurality of switching systems, such as the 5ESS® switching system manufactured and sold by Lucent Technologies, connected together via trunks for the transmission of signals therebetween. Selected ones of the switching systems, commonly referred to as central office switches, are connected to customer premise equipment (CPE) such as telephones, multimedia equipment, fax machines or the like via customer lines. The customer lines can consist of any media suitable for transmitting voice and data including twisted wire pairs, coaxial cable, fiber optic cable or the like.

It is also known in the art to use remote terminals such as digital loop carriers, an example being the SLC® digital loop carrier manufactured and sold by Lucent Technologies Inc., between the central office and the customer premise. Distribution lines connect the central office switch to the remote terminal and customer lines connect the remote terminal to the CPE. In addition to the switching systems and digital loop carriers, other network elements such as broadband distribution elements, PBXs (public branch exchanges) or the like also host customer lines and/or trunks.

The switching systems, remote terminals and other similar network elements terminate the lines and trunks at line units and trunk units, respectively, commonly referred to collectively as interface units. Each line unit or trunk unit includes a plurality of line cards or trunk cards (also referred to in the art as application packs) removably inserted into a subrack or frame. For purposes of this application the line cards and trunk cards are referred to collectively as interface cards. Each line card typically hosts between 1 and 32 lines and each trunk card hosts between 1 or 2 trunks. It will be appreciated that the line cards and trunk cards include common circuitry for controlling functions common to all of the lines or trunks hosted by that unit as well as circuitry specifically dedicated to each line and/or trunk. The line cards typically include circuitry for performing the BOR-SCHT functions of battery feed, overvoltage protection, supervision, coding and decoding, testing as well as ringing. It will be appreciated that the specific functions performed by the line card circuitry can vary. For example, it is known in the art to provide the ringing function for all lines on a separate line card. It will be understood that the circuitry is service specific and that different line cards are used to provide narrowband, ISDN, COIN, special service or the like. The trunk cards include circuitry for performing coding and decoding, dc signaling, test functions, alarming and multiplexing. Thus, the line cards and trunk cards provide the basic processing for each line and trunk in the network and are the physical interface between the switching systems (or other network element) and virtually every line and trunk in the network. As a result, the cost, performance and ease of maintenance and administration of the interface cards are critical. Moreover, because a typical network includes thousands of interface cards, any improvement in the interface card translates to large benefits for the network operator and customer.

Each line card physically consists of a circuit pack containing the line unit circuitry and a face plate connected to one edge of the circuit pack. The line card is removably inserted into a subrack or shelf of the switching system (or other network element) such that the face plate is exposed to the system operator. The circuit pack includes first and second sets of connectors located on the side of the circuit pack opposite to the face plate. When the line card is inserted into the frame, the first and second set of connectors engage mating connectors located at the back of the frame. One set of connectors connect the line card to the backplane of the network element and the other set of connectors connect the line card to cabling that connects to the lines. Because these connectors are located behind the line units at the back of the frame, all of the cabling must terminate at the back of the frame. Because of the amount of cabling used in a typical network element and the location of the cabling in the back of the line unit, it is very difficult to increase the density of the system because additional cabling cannot be added in the limited space at the back of the line unit. The location of the cabling also prevents the line units from being arranged back to back. Moreover, because the cabling must be accessible, the back of the line unit must remain unobstructed. The location of the cabling at the rear of the line unit also requires that the entire line card be removed to disconnect the cabling from the line card. Thus, the location of the cabling makes the administration, maintenance and provisioning of the network element difficult and reduces the line density. These problems are magnified when it is considered that a typical switching system hosts thousands of lines connected to hundreds of line cards. While the above discussion relates specifically to line cards it will be appreciated that the arrangement of trunk cards is substantially the same.

It is also known in the art to make the cable connections using a plurality of pin connectors at the face plate of the line card, rather than at the back of the line unit. While using a plurality of connectors at the front of the line card facilitates access to the cabling, the line cards that use the front connectors rely on a plurality of separate connectors. The use of multiple connectors is relatively expensive and requires the connection and disconnection of a plurality of connectors to install a single line card. Not only is such a design expensive, it increases the time required to replace the interface unit and increases the risk of a misconnected cable.

Thus an improved interface card configuration utilizing a single, front mounted cable connection that is easily disconnected is desired.

SUMMARY OF THE INVENTION

The interface card of the invention consists of a circuit pack containing the line or trunk circuitry and a face plate connected to one side of the circuit pack. A first connector is located on the side of the circuit pack opposite the face plate for connecting the line card to the backplane of the switching system or other network element. A second connector is provided on the face plate for connecting the circuit pack to the cable plug of the line or trunk cabling. In a high density line card the pin connector can consist of over 60 separate pins such that the connector is relatively large and requires 20–30 lbs. of force to disconnect the plug from the connector. The force required to disconnect the plug from the connector combined with the limited space between adjacent connectors would make the disconnection of the pin connector difficult. It has been found that the manual removal of the plug requires that the plug be "wiggled" or twisted during removal. As a result, the pins can easily be damaged thereby making reconnection difficult or impossible, resulting in service interruptions. To facilitate the disconnection of the connector, an ejection mechanism is provided on the face plate of the interface unit of the invention. The ejection mechanism slides relative to the face plate to force camming surfaces into engagement with abutment surfaces on the cable plug thereby forcing the cable plug perpendicularly away from the face plate. Thus the plug is removed without damaging the pin connectors. It will be appreciated that relatively high voltages are sometimes applied to the pin connections (e.g. for ringing or coin operation). Because the front located connector is exposed to the craft working on the switch, it is important that the plug does not inadvertently become disconnected thereby possibly exposing the craft to the high voltage on the pins. Accordingly, a locking device can be optionally provided on the ejection mechanism to lock the cable plug into engagement with the pin connector to prevent inadvertent disconnection.

BRIEF DESCRIPTION OF THE DRAWING

FIG. 2 is a side view of the interface unit of the invention;

FIG. 3 is a front view of the interface unit of the invention;

DETAILED DESCRIPTION

Figure 1:
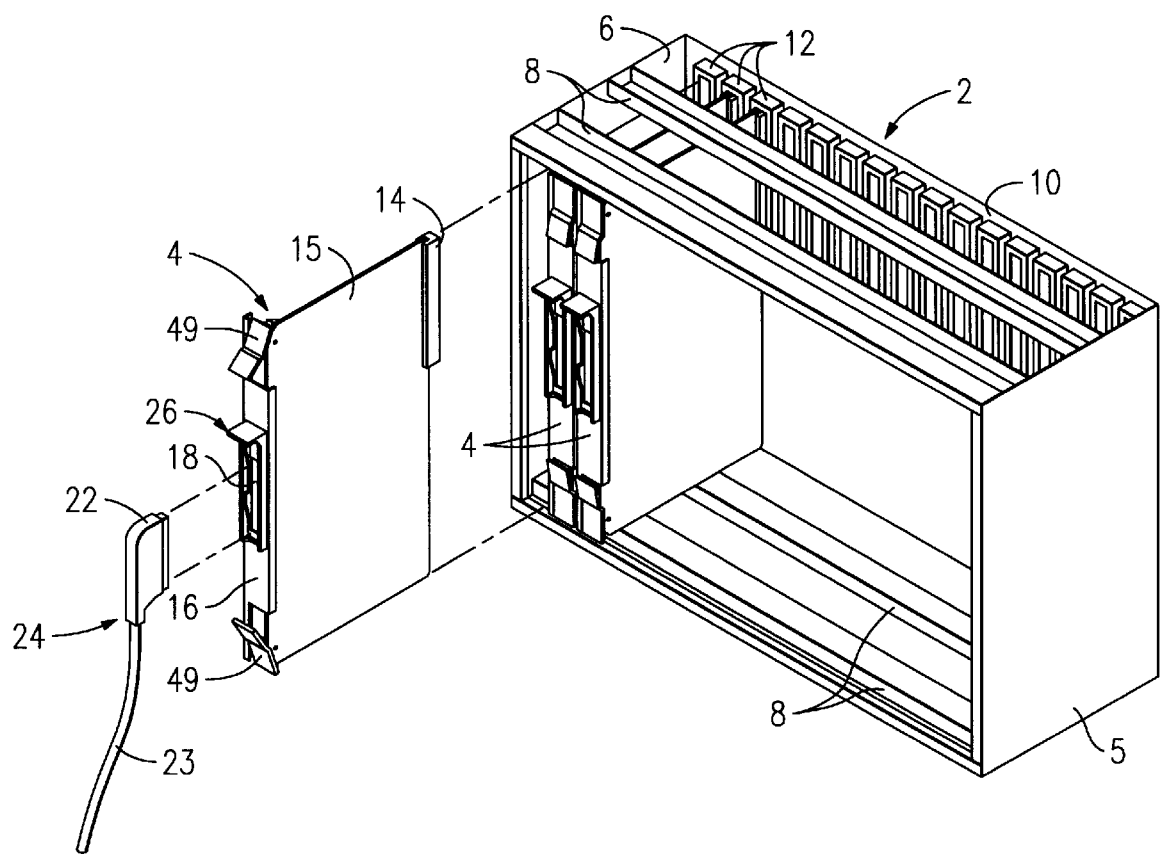
FIG. 1 is a perspective view of the interface unit of the invention and frame of the network element.

Referring more particularly to FIG. 1 a typical subrack or shelf 2 and interface units such as line cards 4 for a switching system or other network element are shown. While specific reference is made to line cards 4, it is to be understood that the construction of the invention also can be used on trunk cards or other interface cards. Subrack 2 consists of side plates 5 and 6 connected by supports 8. A backplane 10 is connected to side plates 5 and 6 including electrical connectors 12, one connector 12 being provided for each of the line cards 4. Connectors 12 releasably engage connectors 14 on the line cards 4 to allow communication between the line card and the switching system or other network element. Line cards 4 consist of a circuit pack 15 having circuitry for controlling the lines hosted by that line card. A face place 16 is connected to the side of the circuit pack opposite to connector 14. Face plate 16 includes latches 49 on either end thereof for securing the line card to the supports 8 of frame 2 when the line cards are inserted in the frame. Face plate 16 includes an aperture 18 through which the plug 22 of cable assembly 24 can access the pin connector of the line unit. Ejection mechanism 26 is provided to disconnect plug 22 from the pin connector as will hereinafter be described. In operation, the line card 4 is inserted into frame 2 so that connector 14 engages the backplane connector 12 and latches 49 engage supports 8. Plug 22 is inserted through aperture 18 into engagement with the pin connectors, as will hereinafter be described, to complete the physical installation of the line card. It will be appreciated that while specific reference has been made to line cards 4, the physical construction of other interface units such as trunk units is identical.

Figure 7:
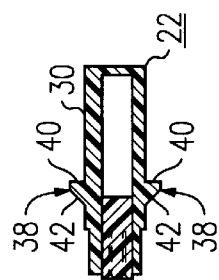
FIG. 7 is a section view taken along line 7—7 of FIG. 5.
Figure 6:
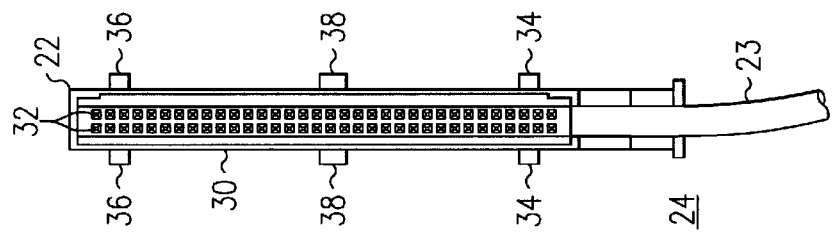
FIG. 6 is a front view of the cable plug of the invention.
Figure 5:
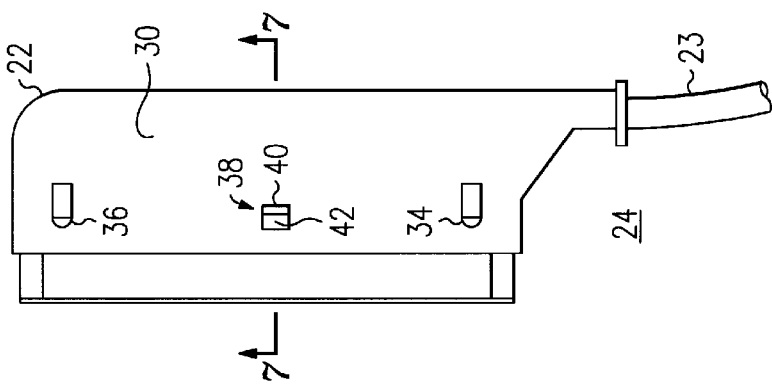
FIG. 5 is a side view of the cable plug of the invention.

Referring more particularly to FIGS. 5 and 6, cable assembly 24 consists of a plug 22 and cable 23 where plug 22 consists of a body 30 having a plurality of receptacles 32 for receiving the pins of connector 20 of the line card 4. Each aperture 32 communicates with an electrical conductor (not shown) that connects to electrical conductors in cable 23 such that when the plug is connected to line card 4 an electrical pathway is created between the pins of connector 20 of the line card and the cable 24. Cable 24 is connected to the customer lines (not shown) as is known in the art. Body 30 includes at least one abutment surface 34 on either side thereof for engaging the ejection mechanism 26 as will hereinafter be described. In the illustrated embodiment, a second abutment surface 36 is provided on each side of body 30 to facilitate the ejection process. Moreover, to positively lock the plug 22 into engagement with the line card 2 a lug 38 is provided on each side of the body 30. Referring to FIGS. 5 and 7, lugs 38 include a first surface 40 that is perpendicular to the body 30 and engages the locking device and a second surface 42 that is at an angle relative to the body for camming open the locking device during insertion of the plug into the line card as will hereinafter be described. If the locking of the plug into the line card is not desired, lugs 38 can be omitted.

Figure 4:
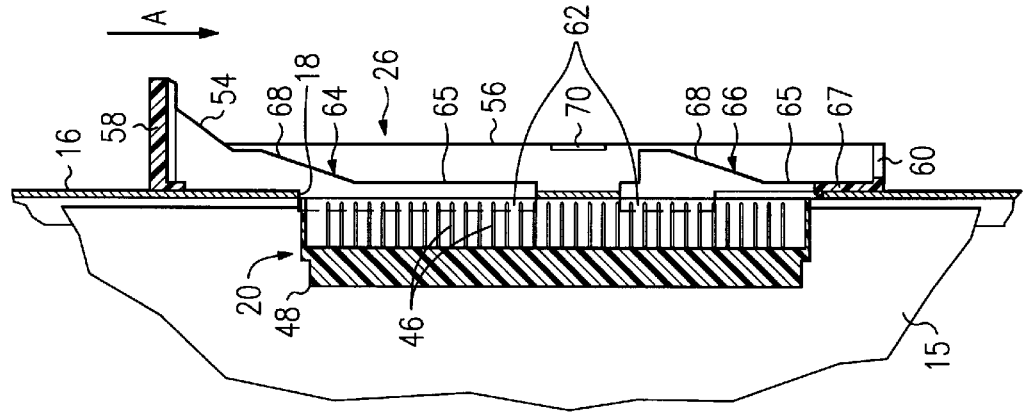
FIG. 4 is a section view taken along line 4—4 of FIG. 3.

Referring more particularly to FIGS. 2–4, line card 2 is shown in greater detail where face plate 16 is connected to one edge of circuit pack 15. Pin connector 20 (FIGS. 3 and 4) consists of a plurality of pins 46 mounted in a housing 48 that is mounted to circuit pack 15 such that the pins are exposed through aperture 18 in the face plate 16. Electrical conductors connect the pins 46 to the circuitry on the circuit pack 15 as is known in the art. Latching mechanisms 49 are provided at either end of the face plate 16 to latch the interface card onto the subrack and securely retain the unit in the subrack. Specifically, each latching mechanism 48 pivots around pin 50 such that detents 51 engage the supports 8.

The ejection mechanism of the invention 26 consists of a slide member 54 having a pair of identical sidewalls 56 and endwalls 58 and 60 arranged such that plug 22 can be inserted between the sidewalls into engagement with the pins 46. To retain slide member 54 on the face plate 16, each of sidewalls 56 include flanges 62 that extend beyond and engage the backside of face plate 16. The flanges 62 are dimensioned such that they are trapped between pin housing 48 and the edges of aperture 18 allowing the sliding member 54 to slide along face plate but preventing the slide member from being removed from the face plate. This attachment design is simple and inexpensive and does not require separate fasteners thus minimizing the manufacturing cost of the line card.

Referring to FIG. 4, located on the inside of each of sidewalls 56 are camming surfaces 64 and 66. Camming surfaces 64 and 66 include a relatively flat portion 65 disposed parallel to face plate 16 and an inclined portion 68 that extends away from the face plate. When the slide member is positioned to receive plug 22 as shown in FIG. 4, the flat portions 65 are aligned with abutment surfaces 34 and 36 of the plug such that the pins 46 can fully engage the receptacles 32. As best shown in FIGS. 3 and 4, a flexible finger 67 extends from endwall 60 to engage the edge of aperture 18 and maintain the slide member 54 in position.

When a force is applied to endwall 58 in the direction of arrow A, slide member 54 moves relative to the face plate 16 in the direction of arrow A and finger 67 is deflected from engagement with the edge of aperture 18. As the slide member 54 moves in the direction of arrow A, inclined surfaces 68 engage abutment surfaces 34 and 36. The inclined surfaces 68 force plug 22 out of engagement with pins 46 in a direction perpendicular to arrow A. Because the movement of plug 30 is perpendicular to the face plate 18 and, therefore, parallel to pins 46, the pin are disengaged without being bent or otherwise damaged. To reinsert the plug 22, the slide member 54 is moved in the direction opposite to arrow A to the position shown in FIG. 4 and the plug 24 is manually reinserted.

To lock the plug 22 into engagement with the pin connector, laterally extending locking members 70 are provided along the upper edges of sidewalls 56. Locking members 70 are located so as to be aligned with lugs 38 when the slide member is in the position shown in FIG. 4. When the plug 22 is inserted into the line card, the bottom inclined surface 42 of lugs 38 engage locking members 70 and force the sidewalls 56 apart a distance large enough to allow the lugs to pass the locking members 70. In this regard it is contemplated that the sidewalls 56 be constructed of a relatively flexible thermoplastic such that the sidewalls can flex outward a sufficient distance to allow passage of the plug. Once the plug 22 is fully inserted, the sidewalls 56 return to the original, unflexed position such that the top flat surfaces 40 of lugs 38 are located behind locking members 70. Because the top surfaces 40 of lugs 38 are aligned behind locking members 70, these surfaces abut such that the sidewalls will not be flexed and the plug cannot be removed if a force is inadvertently applied to the plug. As a result, the plug is securely retained in the line card. When the slide member 54 is slid relative to the face plate 16 to eject the plug 22, the locking members 70 also will move relative to the plug and out of alignment with the lugs, allowing the plug to be ejected. While the use of the locking mechanism is optional, it will prevent the inadvertent disconnection of the plug, thereby preventing electrical shock resulting from inadvertent contact of a person with the exposed pins.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. An improved interface card for use in a network element of the type having a plug for connecting to the interface card, said interface card comprising:
    a circuit pack;
    a face plate connected to said circuit pack defining an aperture therein;
    a connector accessible via said aperture for engaging said plug; and
    ejection means mounted to said face plate for moving said plug in a direction perpendicular to said face plate to disengage said plug from said connector.

2. The interface card according to claim 1, wherein said circuit pack includes circuitry for controlling a line.

3. The interface card according to claim 1, wherein said circuit pack includes circuitry for controlling a trunk.

4. The interface card according to claim 1, wherein said connector includes a plurality of pins, said pins being connected to said circuit pack.

5. The interface card according to claim 1, wherein said ejection means includes a slide member mounted to said face plate such that it can slide in a direction parallel to the face plate between a first position and a second position.

6. The interface card according to claim 5, wherein said slide member includes a camming surface engageable with said plug for ejecting said plug when said slide member is moved between said first position and said second position.

7. The interface card according to claim 1, further including a locking means for retaining said plug in engagement with said connector.

8. The interface card according to claim 7, wherein said locking means includes locking members extending from said slide member, said locking members engaging said plug when the slide member is in the first position and being removed from engagement with said plug when said slide member is in said second position.

9. The interface card according to claim 8, wherein said slide member flexes when said plug is inseted into said connector, allowing said plug to pass said locking members.

10. The interface card according to claim 5, further including means for maintaining said slide member in said first position.

11. The interface card according to claim 10, wherein said means for retaining consists of a flexible finger that engages said aperture.

12. An improved interface card for use in a network element of the type having a plug for connecting the interface card to the network element, said interface card comprising:
    a circuit pack;
    a face plate connected to the circuit pack defining an aperture therein;
    a connector accessible via said aperture for engaging said plug, said connector including a plurality of pins;
    ejection means mounted to said face plate for moving said plug in a direction parallel to said pins to disengage said plug from said connector, said ejection means comprising:
        a slide member connected to said face plate such that it can slide in a direction parallel to said face plate between a first direction and a second direction, said slide member including a camming surface that engages said plug, said camming surface having a first portion arranged parallel to said face plate for allowing the plug to be engaged with said pins when said slide member is in said first position and a second surface arranged at an angle to said face plate for ejecting said plug from said connector when said slide member is in said second position; and
    a locking means for locking said plug into engagement with said connector consisting of a locking member extending from said slide member, said locking member engaging said plug when the slide member is in the first position and being removed from engagement with said plug when the slide member is in the second position, said slide member being flexible to allow said plug to pass said locking member when said plug is inserted into said connector.

13. An improved network element for hosting trunks or lines, comprising:
    an interface card removably connectable to said network element;
    a plug for connecting said interface card to said network element;
    a circuit pack;
    a face plate connected to the circuit pack defining an aperture therein;
    a connector accessible via said aperture for engaging said plug, said connector including a plurality of pins;
    ejection means mounted to said face plate for moving said plug in a direction parallel to said pins to disengage said plug from said connector, said ejection means comprising:
        a slide member connected to said face plate such that it can slide in a direction parallel to said face plate between a first direction and a second direction, said slide member including a camming surface that engages said plug, said camming surface having a first portion arranged parallel to said face plate for allowing the plug to be engaged with said pins when said slide member is in said first position and a second surface arranged at an angle to said face plate for ejecting said plug from said connector when said slide member is in said second position; and a locking means for locking said plug into engagement with said connector consisting of a locking member extending from said slide member, said locking member engaging said plug when the slide member is in the first position and being removed from engagement with said plug when the slide member is in the second position, said slide member being flexible to allow said plug to pass said locking member when said plug is inserted into said connector.

14. The interface card according to claim 1, wherein the interface card is removably insertable into a frame.

15. The interface card according to claim 14, wherein the circuit pack further includes at least one connector engageable with a mating connector on the frame.

16. The interface card according to claim 15, wherein said at lease one connector is positioned proximate a first edge of the circuit pack, and said face plate is positioned proximate a second edge of the circuit pack.

17. An interface card comprising:

a circuit board installable in a frame, said circuit board including at least a first connector engageable with a mating connector on the frame;

a face plate connected to the circuit board, the face plate having an aperture therethrough;

a second connector on the circuit board engageable with a plug inserted through the aperture;

ejection means mounted to the face plate for moving said plug in a direction perpendicular to said face plate to disengage said plug from said second connector.

* * * * *